United States Patent [19]

Levay et al.

[11] Patent Number: 6,067,516

[45] Date of Patent: *May 23, 2000

[54] SPEECH AND TEXT MESSAGING SYSTEM WITH DISTRIBUTED SPEECH RECOGNITION AND SPEAKER DATABASE TRANSFERS

[75] Inventors: Robert Joseph Levay, Santa Clara; Neal J. King, Oakland; Michael Sassin, Santa Clara, all of Calif.

[73] Assignees: Siemens Information; Communication Networks, Inc., both of Boca Raton, Fla.

[ * ] Notice: This patent issued on a continued prosecution application filed under 37 CFR 1.53(d), and is subject to the twenty year patent term provisions of 35 U.S.C. 154(a)(2).

[21] Appl. No.: 08/853,977

[22] Filed: May 9, 1997

[51] Int. Cl.[7] ........................................................ G10L 3/00
[52] U.S. Cl. ............................ 704/244; 704/270; 379/900
[58] Field of Search .................................... 704/235, 270, 704/260, 221, 222, 223, 231, 246, 251, 244; 379/456, 900

[56] References Cited

U.S. PATENT DOCUMENTS

| | | |
|---|---|---|
| 4,799,262 | 1/1989 | Feldman et al. . |
| 5,101,375 | 3/1992 | Goldhor . |
| 5,293,584 | 3/1994 | Brown et al. . |
| 5,475,738 | 12/1995 | Penzias ...................................... 379/67 |
| 5,717,742 | 2/1998 | Hyde-Thomas ............................ 379/88 |
| 5,729,741 | 3/1998 | Liaguno et al. ......................... 395/615 |
| 5,737,395 | 4/1998 | Irribarren .................................. 379/88 |
| 5,752,232 | 5/1998 | Basore et al. ............................ 704/275 |

OTHER PUBLICATIONS

Newton, "Newton's telecommunications dictionary" pp. 339, 186, 104, 105, Nov. 1994.
Dragon, "DragonDictate",Dragon Systems, p. 7, 1995.
Butler–Knight, "Microsoft Office 6–in1", p. 591, 1994.
Booker "E–Mail meets voice mail" Computer World vol. 27 issue 17 start p. 28, Apr. 26, 1993.

*Primary Examiner*—David R. Hudspeth
*Assistant Examiner*—Harold Zintel

[57] ABSTRACT

A system for automatically storing a message comprises a first telecommunication device for transmitting and/or receiving an audio message to a second telecommunication device. Both devices are coupled through a first network for transmitting and receiving telephone calls. A first data processing system with a speaker dependent data base and a second data processing system are provided, both are coupled through a second network for data communication. The first data processing system is coupled with the first telecommunication device and the second data processing system is coupled with the second telecommunication device. At least the first data processing system has a speech recognition system, the second telecommunication device has a control unit which generates a signal after receiving the audio message from said first telecommunication device and has a compare unit. Upon generating the signal the second data processing system converts the audio message into digital data and the compare unit compares the size of the digital data with the size of the data base, whichever is smaller is sent to the other data processing system, which converts the digital data into a text file.

2 Claims, 4 Drawing Sheets

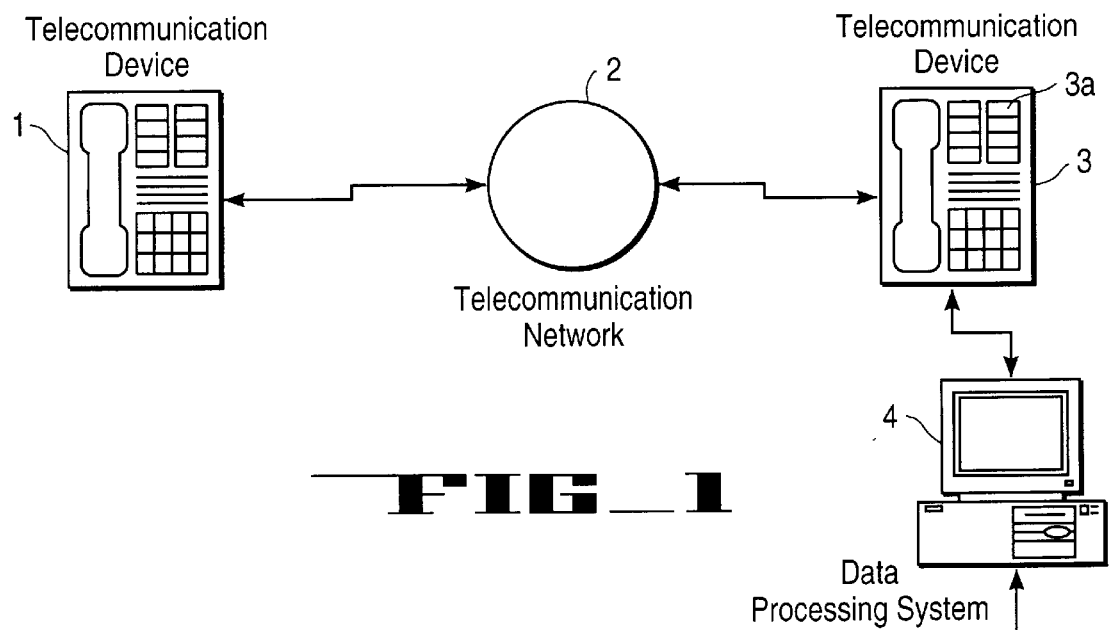
FIG_1
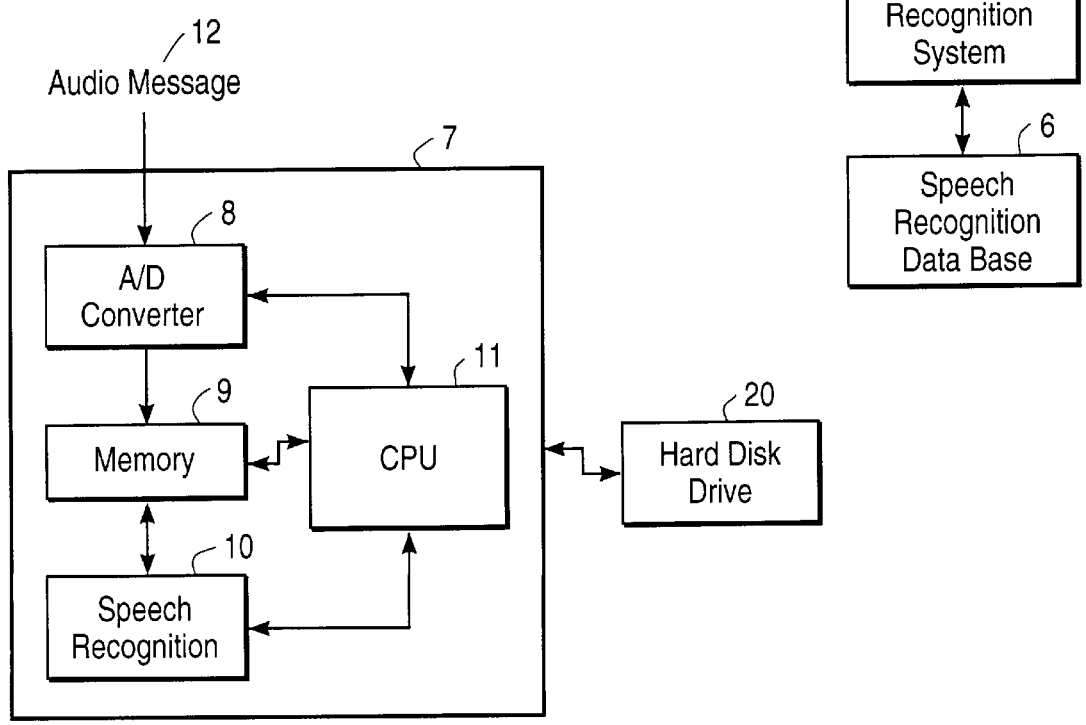
FIG_2

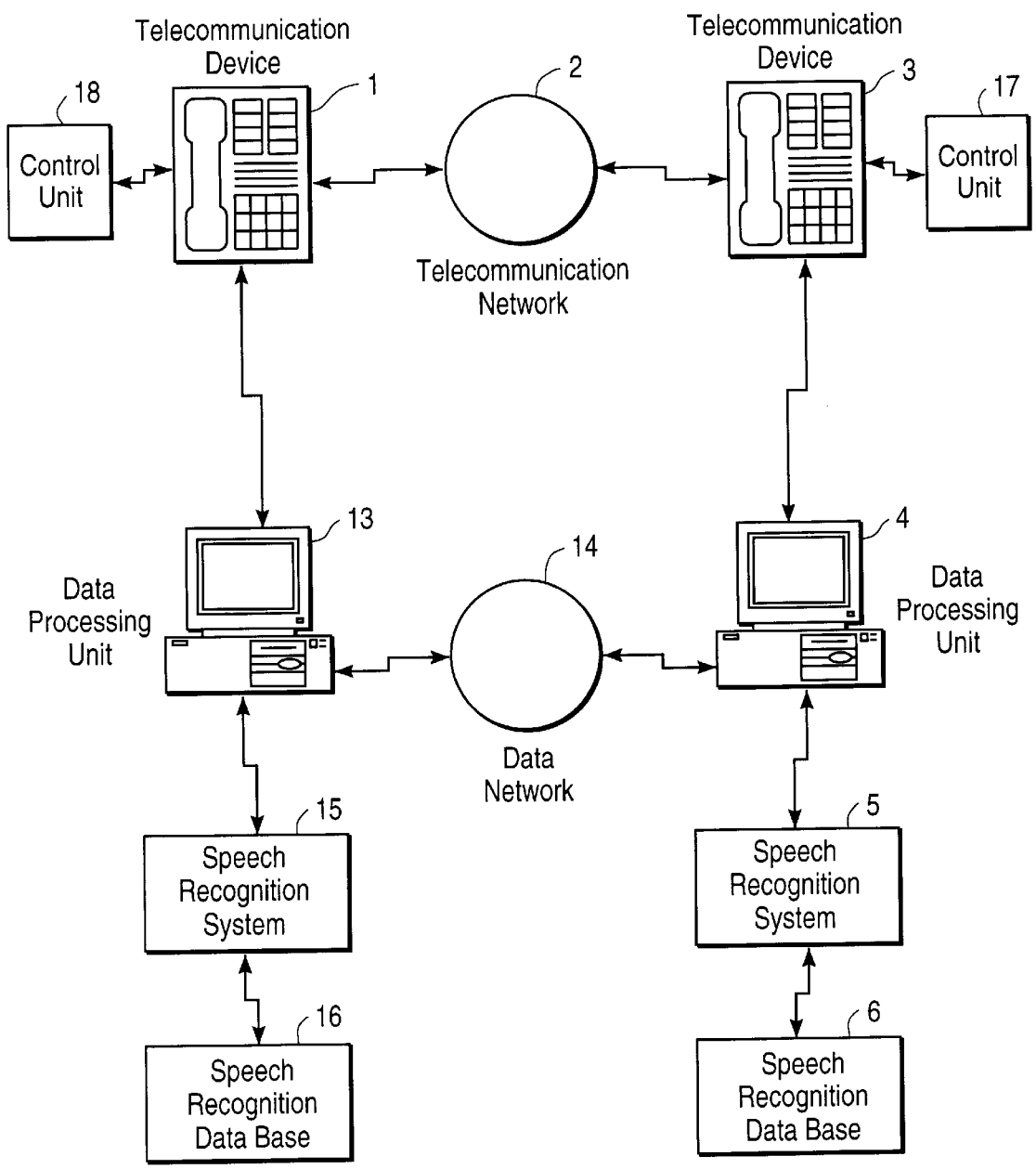
FIG_3

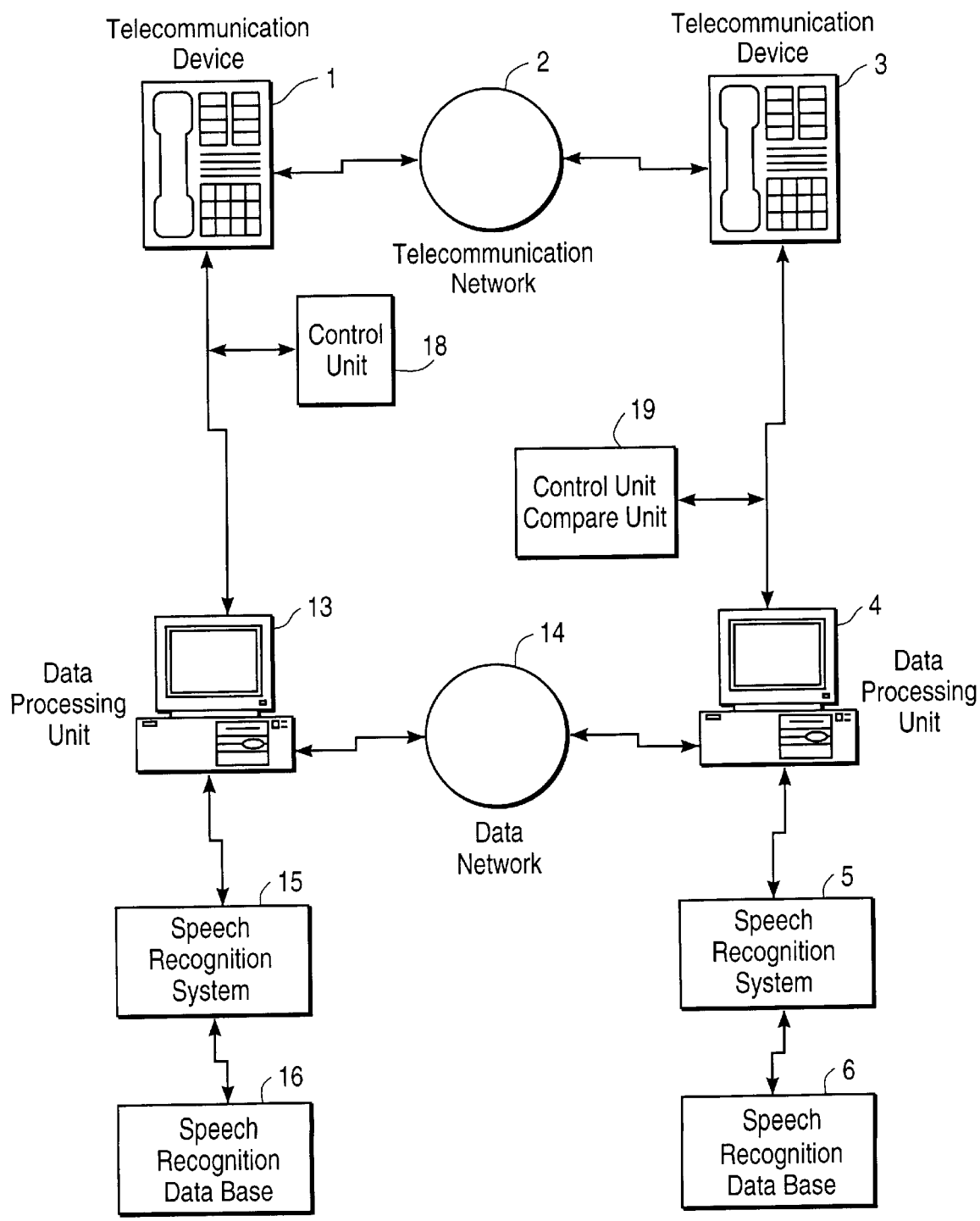
FIG_4

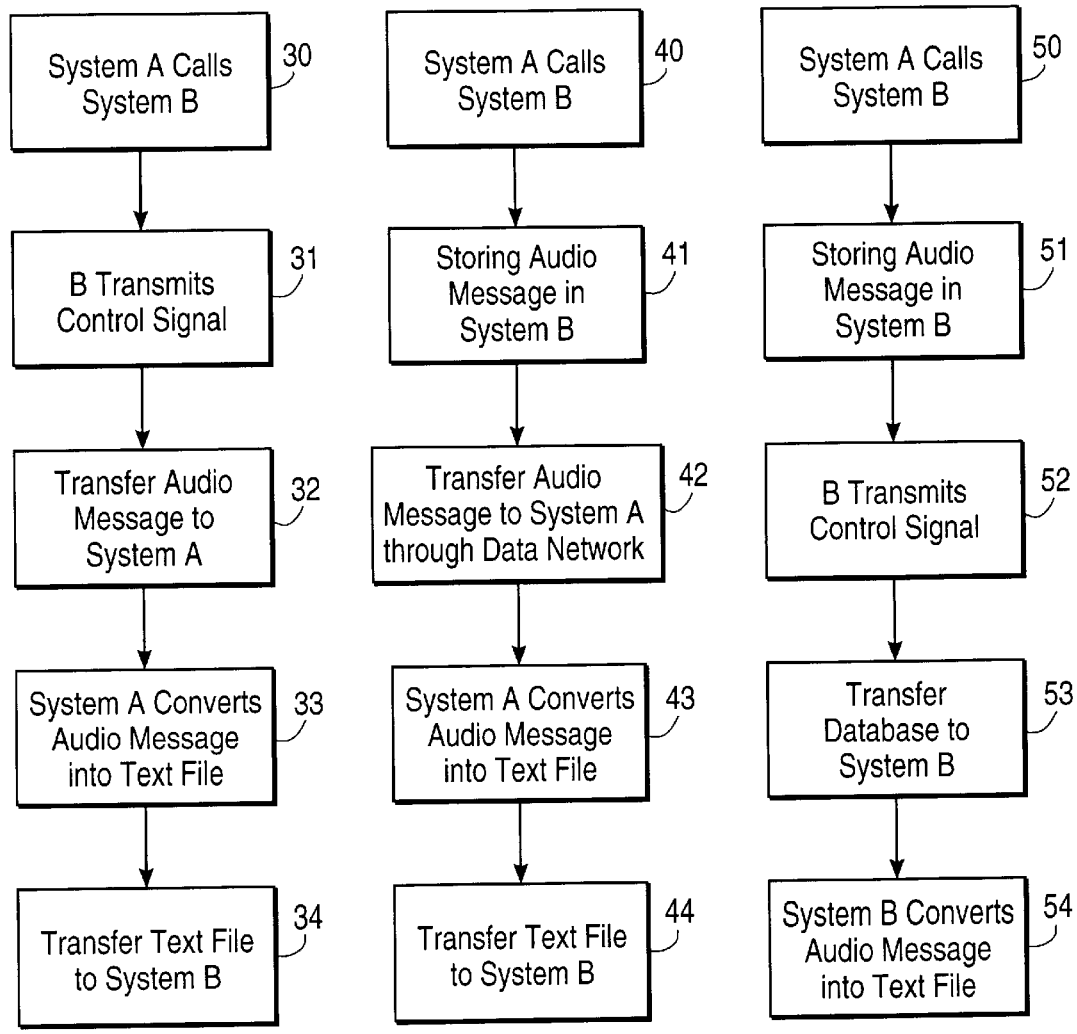

ns an audio message into a text file.
Storing audio messages is well known, for example from
automatic answering machines. Automatic answering
machines are convenient for leaving a message for someone
who is not available at a certain time or for a certain period
of time. Data processing systems, such as a personal
computer, are nowadays equipped with modems and sound
units which are capable of converting such a system into a
multi-media telecommunication device. This multi-media
telecommunication device could be a telephone, answering
machine, fax, network component or network peripheral,
etc.

While such a system is very convenient for regular use, it
needs a certain amount of memory for storing the audio
messages, and it is difficult to organize and manage a larger
amount of audio messages(e.g., in a data base) because the
content of the message cannot be visually recognized. Also,
such a system is not useful for any person with a hearing
impairment. Call centers that handle a large amount of audio
messages, e.g., orders, often need a written text instead of a
spoken message. In many cases, these call centers monitor
certain calls and store them. A text file which contains the
content of the call can also be helpful. Therefore, for many
uses, a written text which can be visualized is needed rather
than an audio message.

SUMMARY OF THE INVENTION

Thus, it is an object of the present invention to provide a
system which converts and stores an audio message into a
text file.

According to the invention, a system for automatically
storing a message comprises a telecommunication device for
transmitting and receiving an audio message coupled to a
telecommunication network. It further comprises a data
processing system including a speech recognition system
connected to the telecommunication device. The telecom-
munication device has a control unit which transfers the
audio message to the data processing system. The data
processing system then converts said audio message into a
digital signal. Further, the system has a memory to store said
digital signal. The speech recognition system converts the
digital signal into a text file and stores it in its memory. The
system may have indicating means, such as a signal lamp, to
indicate to the user that a message has been received.

Such a system can be preferably implemented in a multi-
media computer system, such as a personal computer with
speech recognition system and voice-modem capabilities.
The converted audio message can be stored and managed in
a message data base or a message managing system as a text
file. This is advantageous as a user can easily select a
message out of a plurality of messages when all messages
are in a visualized text form. For example, the user can select
the beginning words, names, etc. of the respective messages.

The speech recognition system can be speaker dependent
or speaker independent. The advantage of a speaker depen-
dent recognition system is that it usually provides a large
vocabulary, whereas when using a speaker independent
system only a smaller number of words can be recognized.

If the speech recognition system is speaker independent,
it receives the audio message and converts it into a text file.

The data processing system can then process this text file
easily, e.g., in a message management program. If the speech
recognition system is speaker dependent, the speech recog-
nition system has to be adapted to the respective speaker/
caller. In this case, every telecommunication device, e.g., a
telephone set, is part of or connected to a respective data
processing system, such as a multi-media personal com-
puter. Each system is equipped with a speaker dependent
speech recognition system having a data base or a parameter
set which has been adapted individually to the respective
owner's voice. This individually different data base or
parameter set is then transmitted from the respective caller's
data processing device, via a data communication network,
to the called person's data processing system which then
converts the audio message into a text file.

In another embodiment, a system for automatically stor-
ing a message comprises a first telecommunication device
for transmitting an audio message to and for receiving an
audio message from a second telecommunication device.
Both devices are coupled to a telecommunication network,
and a first and second data processing system are coupled to
a data communication network. At a minimum the first data
processing system has a speech recognition system, whereby
the second telecommunication device has a control unit
which generates a signal after receiving an audio message
from the first telecommunication device. In such a system,
the speech recognition system is also preferably but not
necessarily speaker dependent.

Upon reception of the signal, the second data processing
system converts the audio message into a digital data signal
and transmits this digital data signal, via the data commu-
nication network, to the first data processing system. The
speech recognition system of the first data processing system
then converts the digital data into a text file and transmits
this text file back to the second data processing system.

Such a system can further comprise a comparing unit
which compares the size of the digitized audio message with
the size of the speech recognition data base or parameter set.
Whichever file is greater remains at that location, and the
other file will be transferred to this location by means of the
data communication network. The audio message is there-
fore either converted at the data processing system of the
called party with the calling party's data base or parameter
set being transferred, or at the data processing system of the
calling party with the digitized audio message being trans-
ferred. Thus, data transfer cost will be minimized.

A further method according to the present invention
comprises the steps of: calling the second telecommunica-
tion device via the first telecommunication device; then
transmitting a signal from the 2nd telecommunication device
to the first telecommunication device requesting that the
audio message will be transferred to the first data processing
system; then converting the audio message into a text file by
means of the speech recognition system; and finally trans-
ferring the text file to the second data processing system via
the data network. After transmission of the signal which
indicates that the second telecommunication device is busy
or the called party cannot answer at this moment, either the
called data processing system or the calling data processing
system can generate an automated answer. This automated
answer can be the same as the automated answers already
provided by commercially available answering machines. If
the first data processing system generates the answer, the
connection through the telecommunications network can be
interrupted. The advantage of this method is, that the actual
connection time through the telecommunication network
can be kept very short, typically only a few seconds. Thus, telephone costs in particular for long distance calls, are less expensive because the duration of the answer start message and the duration of recording the message is not part of the actual telephone call.

Another method according to the present invention comprises the steps of: calling a telecommunication device; storing the audio message in the data processing system associated with the called telecommunication device; transferring the audio message to the calling data processing system via said data network; converting the audio message into a text file by means of a speech recognition system; and finally transferring the text file to the called data processing system via said data network.

A further method according to the present invention comprises the steps of: calling a telecommunication device via a telecommunication network; sending a signal to the calling data processing system indicating that the speech recognition data base or parameter set of the calling data processing system will be transferred to the called data processing system; and then converting the audio message into a text file by means of the speech recognition system of the called data processing system.

All of the above-described methods can easily be performed by a multi-media personal computer which includes a speech recognition system and which is connected to a telecommunication network, e.g., by means of a voice-modem, and to a data communication network, such as the INTERNET, or by means of a local area network or the same telecommunication network. The whole system can also be integrated into a telecommunication device with a computerlike display and keyboard.

The methods according to the present invention all reduce the costs associated with using a telecommunication network. For example, access to the INTERNET generates only local telephone costs. The transmission of a text file through a data communication network also does not have to be synchronized with the actual telephone call and can be performed at any time after the call.

BRIEF DESCRIPTION OF THE DRAWINGS

FIG. 1 is a block diagram of a first embodiment of a system according to the present invention, FIG. 2 is a block diagram of a portion of an integrated system according to the invention, FIG. 3 is a block diagram of a second embodiment of a system according to the present invention, FIG. 4 a block diagram of a third embodiment of a system according to the present invention, FIG. 5 is a flow chart showing a first method according to the present invention, FIG. 6 is a flow chart showing a second method according to the present invention, and FIG. 7 is a flow chart showing a third method according to the present invention.

DESCRIPTION OF THE PREFERRED EMBODIMENTS

FIG. 1 shows a block diagram of a first embodiment of the invention. Telecommunication device 1 can be, for example, a telephone set or a multi-media personal computer equipped with a voice-modem, etc. The telephone set 1 is connected to a common telecommunication network 2, such as an ISDN network or a standard analog network. A second telecommunication device 3 is also connected to this network 2. This second telecommunication device 3 is further connected to a data processing system 4, such as personal computer, which includes or which is connected to a speech recognition system 5. The speech recognition system 5 comprises a speech recognition data base 6 and is speaker independent. The term data base is used throughout the following description for a unit that can store any kind of parameter set or data which is necessary to run a speaker dependent or speaker independent speech recognition system. This unit can be a separate memory device connected to the speech recognition system or it can be incorporated into the speech recognition system. Telecommunication device 3, data processing system 4 and speech recognition system 5 can be incorporated in a multi-media personal computer as described above.

If the user does not answer a telephone call made from the telecommunication device 1 via network 2 to telecommunication device 3, data processing system 4 automatically provides an answering message which includes the request to leave a message on the system. This is done in a manner known from standard answering machines. The answering message can be a synthesized voice message or a digitized spoken message.

FIG. 2 shows portions of an embodiment of an integrated system. The analog voice message 12 is fed to an analog/digital converter 8 which converts it to digital data. The analog signal can also be converted by a codec in the voice-modem (not shown). This digital data will be stored in a memory 9. A speech recognition system 10 is provided which is also connected to memory 9. The integrated system is controlled by a CPU 11 which is connected to all elements in this system. For permanent storing of the text file, a hard disk 20 is provided which is coupled with the system 7.

After receiving and converting the audio message, it is stored as digital data in memory 9 of the system 7 or 4. Then, speech recognition system 5 or 10 converts this digitized audio message into a text file which will be permanently stored, for example on a hard disk 20. The speech recognition system can be any system known in the art. For example, U.S. Pat. No. 5,293,584 and U.S. Pat. No. 4,799,262 disclose different available speech recognition systems. The received text files can then be presented to the user in a way similar to an e-mail system or they can be stored in a message data base for further processing. The telecommunication device, e.g., a telephone set, can be equipped with a indicator lamp 3a, such as a LED, which indicates that a new message has been received. The indicator lamp can also be incorporated in the data processing system 4. Such a system is particularly useful for persons with hearing impairment or for anyone who needs information in a written visualized form.

FIG. 3 shows another example of an embodiment of the present invention. Two telecommunication devices, such as telephone sets 1 and 3, are coupled through a telecommunication network 2, such as an ISDN network or a standard analog network. Data processing systems, such as personal computers (PC) 13 and 4, are associated with telephone sets 1 and 3. PC 13 is connected to telephone set 1, whereas PC 4 may or may not be connected to telephone set 3. This is indicated by dotted lines. Telephone sets 1 and 3 can be equipped with or can be connected to control units 17 and 18, respectively. These control units 17 and 18 may also be incorporated in PC's 13 and PC 4 or their function may be provided by PC's 13 and 4 or can be part of terminals 1 and 3. PC's 13 and 4 are coupled to each other through a data communication network 14, such as the INTERNET, an ISDN-network or a LAN, etc. This coupling can also be done through the same telecommunication network 2 by means of modems, etc. PC 13 is connected with or equipped with a speech recognition system 15 which in turn is connected to or includes a speech recognition data base 16. PC 4 may also have such a speech recognition system 5 and database 6.

FIG. 5 shows a flow chart of the function of this system. In the following example user A with telephone set 1 and PC 13 tries to call user B with telephone set 3 and data processing unit (PC) 4 (FIG. 5, step 30), but user B cannot answer the call. In this case, control unit 17 generates a control signal which is sent back to telephone set 1 (FIG. 5, step 31). In a digital ISDN network, this signal will be a digital control signal, whereas in an analog network such a digital control signal has to be converted, e.g., through a modem, which is part of control unit 17 or PC 4. This control signal contains data about the called party, such as name, e-mail address, etc. Before sending this signal, control unit 17 might send an answer message to user A indicating that the calling party should leave a message. Instead of generating this answer message with control unit 17 or PC 4, this can be done by control unit 18 or PC 13 after receiving the respective control signal. In this case, a standard answer message would be generated such that, for example, the transmitted name of the called party is inserted. For example, the message may state the following: "The number you called 'Mister X' is not available, please leave a message." After sending the control signal, the connection between the two telephone sets 1 and 3 can be terminated. If only the control signal is sent, the connection time will be very short, and therefore only a minimum of telephone costs will be incurred. This is advantageous particularly with long distance calls.

Hereinafter, a connection is established between telephone set 1 and PC 13 to transfer a message to PC 13 (FIG. 5, step 32). Therefore, telephone set 1 is provided with a analog or digital interface. PC 13 can comprise a system, such as shown in FIG. 2. PC 13 converts the audio message into digital data (FIG. 5, step 33) which will be stored in its memory 9. Speech recognition system 15 or 10 then converts the digitized audio message into a text file. This text file is then sent to PC 4 (FIG. 5, step 34) which is associated with telephone set 3 of the called user B. Finally, the text file is stored permanently, for example, in a data base or message handling system, such as an e-mail system.

Another embodiment of the present invention is shown in FIG. 4 with the respective flow charts in FIG. 6 and FIG. 7. FIG. 4 is similar to FIG. 3. For example, PC 4 is connected to telephone set 3, but a possible connection exists between PC 13 and telephone set 1. This possible connection is again indicated by dotted lines. The speech recognition systems 15, 16 and 5, 6 are again speaker dependent. The data bases 16 and 6 contain parameters which are speaker dependent and necessary for running the respective speech recognition program. These parameters are created when individual users set-up the respective systems.

If a call from telephone set 1 to telephone set 3 is made (FIG. 6, step 40; FIG. 7, step 50), control unit 19 generates an answering message as described above. The connection between the two telephone sets 1 and 3 is hereinafter upheld, while the audio message is transferred through network 2 to PC 4 where it will be converted into digital data and stored as described above (FIG. 6, step 41; FIG. 7, step 51). In a first mode, PC 4 sends this digital data via the data communication network 14 to PC 13 (FIG. 6, step 42) where it will be converted into a text file (FIG. 6, step 43) by means of the speaker dependent speech recognition system 15, 16 and then transmitted back to PC 4 (FIG. 6, step 44) where it will be stored permanently. In a second mode, PC 4 requests the digital data from speech recognition data base 16 (FIG. 7, step 52) of the associated speech recognition system 15. After the digital data of the database 16 is received and stored in database 6 (FIG. 7, step 53), PC 4 converts the audio message into a text file (FIG. 7, step 54). This text file can be handled as described above.

In addition, in a further embodiment, the receiving side can comprise a compare unit 19 which is connected to PC 4. The function of compare unit 19 can also be provided by PC 4. With compare unit 19, it is possible to manage both above-described modes automatically. Therefore, compare unit 19 compares the size of the digital data with the size of speech recognition data base 16. The size of the speech recognition data base might be predetermined or PC 13 can provide PC 4 with this information. Whichever is smaller will be transferred to the other PC 4 or 13 through data communication network 14. The conversion into a text file is then done either by speech recognition system 15 with the transmitted digital data or by the speech recognition system 5 loaded with the transmitted individual data base 16. Transmitting of the text file, if necessary, and storing of the text file will be completed as described above. This method has the advantage of only using the minimum data communication network time.

The above described applications are not necessarily limited to the function of an automatic answering machine. Such a system may be incorporated in any telecommunication device, so any user can activate the system to convert an audio message into a text file. For example, a user can activate the system at any time during a call to save important parts of a conversation into a text file.

We claim:

1. A system for automatically storing a message comprising: a first telecommunication device for transmitting and/or receiving an audio message to a second telecommunication device, both devices being coupled through a first network for transmitting and receiving telephone calls, a first data processing system with a speaker dependent data base and a second data processing system, both being coupled through a second network for data communication, said first data processing system being coupled with said first telecommunication device and said second data processing system being coupled with said second telecommunication device, at least said first data processing system having a speech recognition system, said second telecommunication device having a control unit which generates a signal after receiving said audio message from said first telecommunication device and having a compare unit, upon generating said signal said second data processing system converting said audio message into digital data and said compare unit comparing the size of said digital data with the size of the data base, whichever is smaller being sent to the other data processing system, which converts the digital data into a text file.

2. A system for automatically storing an audio message according to claim 1, wherein at least one of said telephone sets is formed within one of said data processing systems.

* * * * *